United States Patent
Shintre et al.

(10) Patent No.: US 10,542,034 B1
(45) Date of Patent: Jan. 21, 2020

(54) PROVIDING ADVERSARIAL PERTURBATIONS TO MEDIA

(71) Applicant: Symantec Corporation, Mountain View, CA (US)

(72) Inventors: Saurabh Shintre, Sunnyvale, CA (US); Reuben Alan Feinman, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 144 days.

(21) Appl. No.: 15/676,392

(22) Filed: Aug. 14, 2017

(51) Int. Cl.
*H04L 9/00* (2006.01)
*H04L 29/06* (2006.01)
*G06F 21/55* (2013.01)
*G06N 3/08* (2006.01)

(52) U.S. Cl.
CPC ........ *H04L 63/1441* (2013.01); *G06F 21/554* (2013.01); *G06N 3/08* (2013.01); *G06F 2221/031* (2013.01)

(58) Field of Classification Search
CPC ...... H04L 63/1441; G06F 21/554; G06N 3/08
See application file for complete search history.

(56) References Cited

U.S. PATENT DOCUMENTS

| | | | |
|---|---|---|---|
| 2014/0341442 A1* | 11/2014 | Lewis | G06K 9/00248 382/118 |
| 2015/0029216 A1* | 1/2015 | Martin | G06K 9/00228 345/626 |
| 2015/0306330 A1* | 10/2015 | Richard | A61M 16/0605 348/77 |
| 2018/0000179 A1* | 1/2018 | Simon | A41G 7/02 |
| 2018/0075665 A1* | 3/2018 | Konoplev | G06T 19/20 |

OTHER PUBLICATIONS

SudoApp—free calls, https://sudoapp.com/features. Accessed Aug. 17, 2017.
Tor: Overview; https://www.torproject.org/about/overview.html.en. Accessed Aug. 17, 2017.

* cited by examiner

*Primary Examiner* — Beemnet W Dada
(74) *Attorney, Agent, or Firm* — Holland & Hart LLP

(57) ABSTRACT

A method for applying perturbations to electronic media is described. A computing device may receive an electronic request to upload an electronic media to an internet-based service and perform a pre-processing operation on the electronic media based on the electronic request and a feature of the electronic media. In some examples, the computing device may perform a security action on the electronic media. For example, the computing device may apply perturbations to elements of the electronic media based on a gradient of a model. The computing device may transmit the electronic media to the internet-based service.

20 Claims, 11 Drawing Sheets

PROVIDING ADVERSARIAL PERTURBATIONS TO MEDIA

BACKGROUND

The following relates generally to providing adversarial perturbations to multimedia, and more specifically to applying adversarial perturbations to multimedia to protect user-privacy against machine learning-based recognition algorithms. The use of computer systems and computer-related technologies continues to increase at a rapid pace. The expansive use of computer systems has influenced the advances made to computer-related technologies. Computer systems have increasingly become an integral part of the business world and the activities of individual consumers. Computer systems may be used to carry out internet-based services.

The widespread use of computers and mobile devices, in internet-based services such as social networks, has provided advances in machine learning and computer vision technologies for image recognition, which may present various potential breach of privacy issues.

SUMMARY

The described disclosure relates to improved techniques that support applying adversarial perturbations to electronic media to protect user-privacy against machine learning-based recognition algorithms. A computing device may provide a privacy protection service based on a machine learning-based model. In some examples, the computing device may be a network proxy, or a server, or a mobile phone running an application, or any combination thereof. The privacy protection service may be an internet-based service, or it may be a computing device-based application, i.e., an application running on the computing device. The privacy protection service may provide perturbations to electronic media. For example, an individual may request to upload an image to an internet-based service, such as an image sharing service. Prior to uploading the image, the computing device may transmit the image to a network proxy (e.g., a bluecoat middle box, a network proxy server) for pre-processing at the network proxy. Alternatively, the image may be pre-processed by an application running on the computing device.

The network proxy or computing device-based application may apply perturbations to the electronic media. For instance, in the previous example, the network proxy may apply perturbations to the image. The image with the applied perturbations may appear visually the same to an individual as the original image. By applying the perturbations to the image, the described techniques may effectively fool machine learning-based and computer vision-based image recognition models by exploiting a known vulnerability, called adversarial sample crafting. As such, contents of the image with the applied perturbations may avoid being recognized by an image recognition model. That is, the image recognition model may be unsuccessful in detecting and identifying individuals within the image based on the applied perturbations. Upon pre-processing the image, the network proxy or computing device may transmit the pre-processed image to a server, in this case a social network server that supports the internet-based service.

According to at least one embodiment, a method for applying perturbations to electronic media is described. The method may include receiving an electronic request to upload an electronic media to an internet-based service; performing a pre-processing operation on the electronic media based at least in part on the electronic request and a feature of the electronic media; and transmitting the electronic media to the internet-based service.

A computing device configured for applying perturbations to electronic media is also described. The computing device may include one or more processors and memory in electronic communication with the one or more processors. The memory may store computer executable instructions that when executed by the one or more processors cause the one or more processors to receive an electronic request to upload an electronic media to an internet-based service; perform a pre-processing operation on the electronic media based at least in part on the electronic request and a feature of the electronic media; and transmit the electronic media to the internet-based service.

A non-transitory computer-readable storage medium storing computer executable instructions is also described. When the instructions are executed by one or more processors, the execution of the instructions may cause the one or more processors to receive an electronic request to upload an electronic media to an internet-based service; perform a pre-processing operation on the electronic media based at least in part on the electronic request and a feature of the electronic media; and transmit the electronic media to the internet-based service.

In some examples of the method, apparatus, and non-transitory computer-readable medium described above, the pre-processing operation is performed prior to transmitting of the electronic media to the internet-based service to upload the electronic media to the internet-based service.

Some examples of the method, computing device, and non-transitory computer-readable storage medium described above for performing the pre-processing operation may further include processes, features, means, or instructions for performing an analysis on the electronic media; detecting facial data associated with the electronic media based at least in part on the analysis; and performing a security action on the electronic media based at least in part on the detected facial data. Some examples of the method, computing device, and non-transitory computer-readable storage medium described above for performing the security action may further include processes, features, means, or instructions for applying perturbations to elements of the electronic media based at least in part on a gradient of a model.

In some examples of the method, apparatus, and non-transitory computer-readable medium described above, the electronic media comprises a digital image and the elements comprises a plurality of pixels of the digital image. Some examples of the method, computing device, and non-transitory computer-readable storage medium described above for applying the perturbations may further include processes, features, means, or instructions for applying a perturbation to each pixel of the digital image based at least in part on an algorithm.

In some examples of the method, apparatus, and non-transitory computer-readable medium described above, the electronic media comprises a digital image and the elements comprises a plurality of pixels of the digital image. Some examples of the method, computing device, and non-transitory computer-readable storage medium described above for applying the perturbations may further include processes, features, means, or instructions for applying a perturbation to each pixel associated with the facial data of the digital image. In some examples of the method, apparatus, and non-transitory computer-readable medium described above, an identity associated with an individual of the facial data is masked to one or more image recognition algorithms associated with the internet-based service based at least in part on the applied perturbations to the facial data of the digital image.

In some examples of the method, apparatus, and non-transitory computer-readable medium described above, the model of the gradient is associated with a neural network model using a public database of electronic media. Some examples of the method, computing device, and non-transitory computer-readable storage medium described above for performing the pre-processing operation may further include processes, features, means, or instructions for identifying metadata associated with the electronic media; and removing the metadata from the electronic media based at least in part on the identifying.

In some examples of the method, apparatus, and non-transitory computer-readable medium described above, the feature of the electronic media comprises facial data. In some examples of the method, apparatus, and non-transitory computer-readable medium described above, the electronic media comprises at least one photograph image or at least one video image, or both. In some examples of the method, apparatus, and non-transitory computer-readable medium described above, the one or more computing devices comprise at least one of a network proxy, or a server, or a mobile phone running an application, or any combination thereof. In some examples of the method, apparatus, and non-transitory computer-readable medium described above, the performing the pre-processing operation on the electronic media is performed by a network proxy.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

Figure 1:
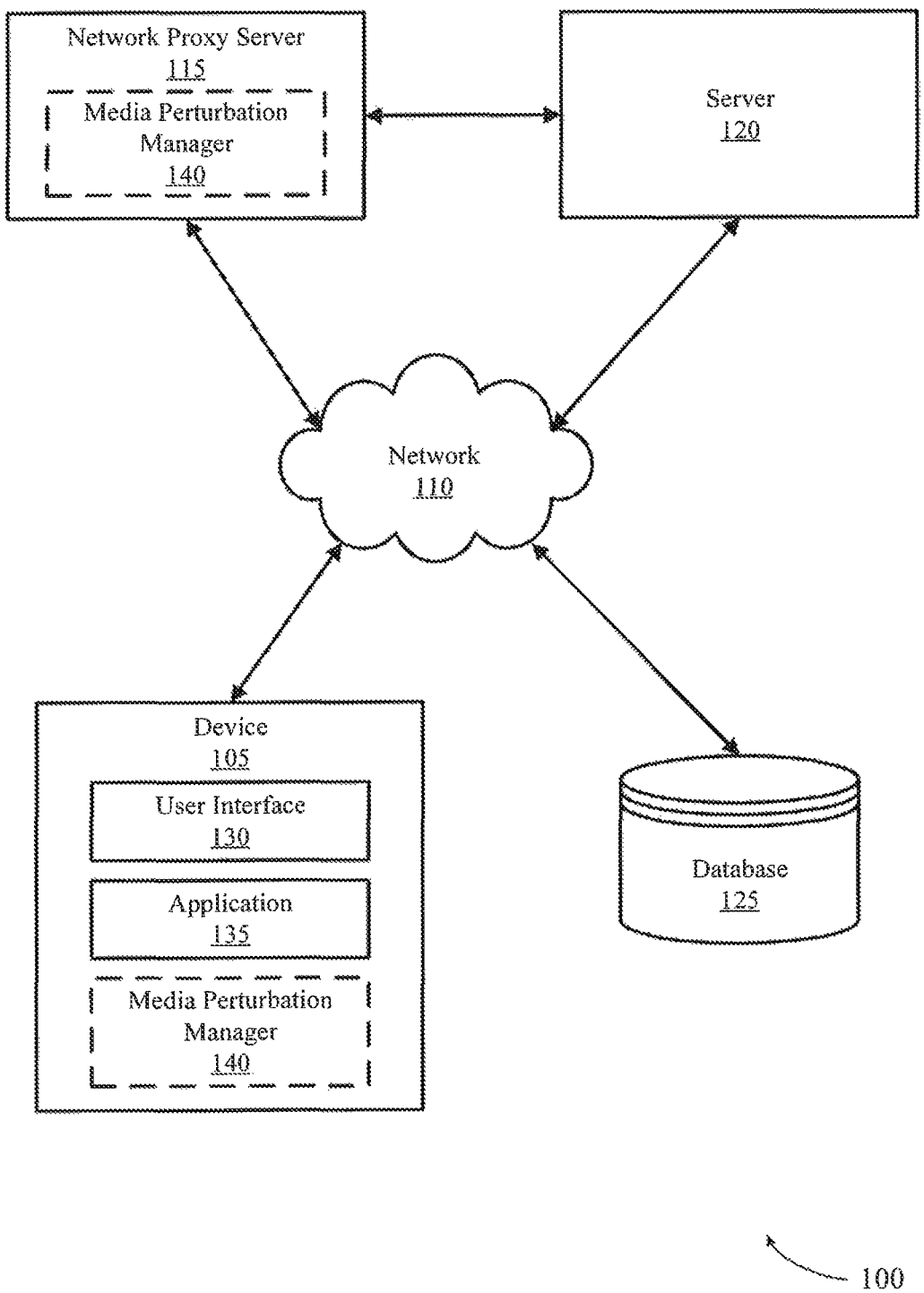
FIG. 1 illustrates an example of a block diagram of an environment that supports applying adversarial perturbations to electronic media to protect user-privacy against machine learning-based recognition algorithms, in accordance with aspects of the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The described disclosure is generally directed to providing an improvement to consumer privacy. In particular, the described disclosure relates to improved techniques that support applying adversarial perturbations to electronic media to protect user-privacy against machine learning-based recognition algorithms. The techniques described herein may be provided on a network proxy or a consumer application for mobile and desktop operating systems. According to the techniques described herein, a number of small and unperceivable perturbations are applied to consumer images such that to protect the privacy of individuals depicted in the image.

In one case, some examples of internet-based services use machine learning-based and computer vision-based techniques to identify individuals in uploaded media, predict associated trends with the uploaded media, and automatically annotate the uploaded media for indexing purposes. In another case, some internet-based services use similar mechanisms to identify all media (e.g., photographs) that match an individual in an input media. However, the application of machine learning-based and computer vision-based techniques to identify individuals in uploaded media has caused an increased concern about privacy.

The availability of personal information freely shared through internet-based services makes it easy for malicious individuals committing fraud to compromise identity information or provide a potential platform for cyber stalking. Some examples of existing mechanism for providing privacy include obscuring an image, such as blurring of an individual in an image. However, this mechanism becomes undesirable in scenarios of publically shared media on internet-based services (e.g., social networks). Therefore, existing techniques related to internet-based services (e.g., image sharing services) do not provide any mechanism for protecting the privacy of individuals that are included in publically shared media, while preserving the recognizable visual identify of the individual.

Existing image recognition technologies rely on neural network models that build increasingly complex representations of an input image via a hierarchy of non-linear filters. These filters are developed using a training set of images: in order to classify faces. For example, some social network deployments use a number of images (i.e., tens to hundreds) of each of its subscribers to build a neural network model. While, neural network models are incredibly powerful, the techniques of the present disclosure benefit on the vulnerability of adversarial perturbations: small worst-case changes applied to an image, that are generated explicitly to fool the neural network models. These perturbations are generated by computing a gradient of the neural network model output with respect to the inputs, and directing the input perturbations based on the gradient. In some cases, however, when the underlying model is unavailable, and thus its gradient cannot be assessed, a property regarding the transferability of adversarial perturbations becomes important. Adversaries who do not have access to the target model can use a substitute neural network model of their own design, trained on a non-identical training set, and craft perturbations to fool that model. The resulting images should be adversarial not only for the substitute model, but the target model as well, due to the transferability principle.

According to the techniques described herein, a neural network model is generated based on a combination of publicly available and consumer-provided images. When an individual requests to upload an image to the Internet, the neural network model will pre-process that image by adding an adversarial perturbation. These perturbations may protect the images from image recognition software used within various web services.

Aspects of the disclosure are initially described in the context of a wireless communications system. Exemplary devices, servers, and process flows that support applying adversarial perturbations to electronic media to protect user-privacy against machine learning-based recognition algorithms. Aspects of the disclosure are further illustrated by and described with reference to apparatus diagrams, system diagrams, and flowcharts that relate to generating and applying adversarial perturbations to electronic media to protect user-privacy against machine learning-based recognition algorithms.

FIG. 1 illustrates an example block diagram of an environment 100 that supports applying adversarial perturbations to electronic media to protect user-privacy against machine learning-based recognition algorithms, in accordance with aspects of the present disclosure. In some embodiments, the techniques described herein may be performed on a device (e.g., device 105, network proxy server 115). As depicted, the environment 100 may include a device 105, a network proxy server 115, a server 120, a database 125, and a network 110. In the illustrated embodiment, the device 105, the network proxy server 115, the server 120, and the database 125, are communicatively coupled via network 110.

The device 105 in environment 100 may be used by way of example. While, environment 100 illustrates a single device 105, the present disclosure applies to any system architecture having one or more devices 105. Furthermore, while a single network 110 is coupled to the device 105, the network proxy server 115, the server 120, and the database 125, the present disclosure applies to any system architecture having any number of networks 110 that may be communicatively coupled to the device 105, the network proxy server 115, the server 120, and the database 125. Similarly, while environment 100 illustrates a single network proxy server 115 and a single server 120, the present disclosure applies to any system architecture having one or more network proxy server 115 or server 120.

In some embodiments, device 105 may include a personal electronic device such as a cellular phone, a personal digital assistant (PDA), a tablet computer, a laptop computer, or a personal computer. In some embodiments, the device 105 may include a user interface 130, an application 135, and optionally a media perturbation manager 140. Application 135 in some examples, may be an internet-based service such as an image or video sharing service. Although the components of the device 105 are depicted as being internal to the device 105, it is understood that one or more of the components may be external to the device 105 and connect to device 105 through wired or wireless connections, or both.

Network proxy server 115 may be a server, computer system, or an application that may be an intermediary node in environment 100 between device 105, server 120, or database 125. For example, network proxy server 115 may receive electronic requests from device 105 seeking resources from database 125. In another example, network proxy server 115 may receive electronic requests from device 105 instructing network proxy server 115 to provide electronic media to server 120 for upload, or retrieve electronic media from server 120 for download. Server 120 may include any combination of a social network server, data server, a cloud server, a server associated with an automation service provider, proxy server, mail server, web server, application server, database server, communications server, file server, home server, mobile server, name server, or any combination thereof.

In some embodiments, device 105 may communicate with network proxy server 115 and server 120 via network 110. Examples of network 115 may include any combination of cloud networks, local area networks (LAN), wide area networks (WAN), virtual private networks (VPN), wireless networks (using 802.11, for example), cellular networks (using 3G, LTE, or new radio (NR) systems (e.g., 5G) for example), etc. In some configurations, the network 110 may include the Internet. It is noted that in some embodiments, the device 105 may not include a media perturbation manager 140. For example, device 105 may include application 135 that allows device 105 to interface with a user via media perturbation manager 140 located on another device such as network proxy server 115 or server 120, or both.

In some embodiments, device 105, network proxy server 115, and server 120 may include a media perturbation manager 140 where at least a portion of the functions of media perturbation manager 140 are performed separately or concurrently on device 105, network proxy server 115, or server 120, or any combination thereof. Similarly, in some embodiments, a user may access the functions of device 105 (directly or through device 105 via media perturbation manager 140). For example, in some embodiments, device 105 may include a mobile-based application that interfaces with one or more functions of media perturbation manager 140, or network proxy server 115, or server 120.

In some embodiments, server 120 may be coupled to database 125. Database 125 may be internal or external to the server 120. In one example, device 105 may be coupled directly to database 125, database 125 being internal or external to device 105. Database 120 may include electronic media (e.g., videos, images).

In some cases, the device 105 or the network proxy server 115 may provide a privacy protection service based on a machine learning-based model. The privacy protection service may be an internet-based service, or it may be a computing device-based application, i.e., an application running on the computing device. The privacy protection service may provide perturbations to electronic media. In some examples, the electronic media may include a photograph image or at least one video image, or both. Application 135 may generate an electronic request to upload an electronic media to an image or video sharing service hosted by server 120. For example, an individual may request to upload an image or a video to a social network. In this case, the image or video sharing service may be a social networking website and server 120 may be a social network server.

Prior to uploading the electronic media, the device 105 may transmit the electronic media to a network proxy (e.g., a bluecoat middle box, a network proxy server 115) for pre-processing at the network proxy. In this case, application 135 of device 105 may transmit the electronic request to upload the image or the video to network proxy server 115. The electronic request may include the image or the video. The network proxy server 115 may receive the electronic request including the image or the video, and perform a pre-processing operation on the electronic media based on the electronic request and a feature of the electronic media. In some embodiments, media perturbation manager 140 of network proxy server 115 may perform the pre-processing operation on the electronic media.

In some cases, the pre-processing operation may be performed by network proxy server 115, prior to transmitting of the electronic media to the internet-based service hosted via server 120, for uploading to the internet-based service. In some examples, media perturbation manager 140 of network proxy server 115 may perform an analysis on the electronic media as part of the pre-processing operation. In this case, the analysis may be performed on the image or the video included in the electronic request transmitted by device 105. In some cases, the media perturbation manager 140 of network proxy server 115 may convert the image or the video to a specific format type (e.g., .JPEG, .PNG., .AVI, .MOV, .WMV) prior to performing the pre-processing operation.

Media perturbation manager 140 of network proxy server 115 may detect facial data associated with the electronic media based on the analysis. In some cases, the analysis may include detecting key-features by applying a key-point detection algorithm to the electronic media. The key-point detection algorithm may be a Bayesian model that media perturbation manager 140 of network proxy server 115 may apply to the electronic media to identify one or more key-features such as eyes, nose, mouth, eyebrows, ears, jaw-line, etc. The key-feature(s) may be provided in the facial data. For example, media perturbation manager 140 of network proxy server 115 may determine that one or more individuals are present in the image associated with the electronic request. Alternatively, in the case, of the electronic request including a video, media perturbation manager 140 of network proxy server 115 may identify a start time and an end time of the video, split the video into multiple frames, and analyze each of the frames to determine frames that include key-features.

Upon detected facial data in the electronic media, media perturbation manager 140 of network proxy server 115 may perform a security action on the electronic media. A security action may include generating and applying one or more perturbations to the electronic media. For instance, in the previous example, the media perturbation manager 140 of network proxy server 115 may apply perturbations to the image or each frame of the video. In some cases, media perturbation manager 140 of network proxy server 115 may apply perturbations to elements of the electronic media based on a gradient of a model. The gradient may be associated with a neural network model using a public database of electronic media. As such, contents of the electronic media with the applied perturbations may avoid being recognized by the neural network model (e.g., an image recognition model). That is, the image recognition model may be unsuccessful in detecting and identifying individuals within the image based on the applied perturbations.

In the case, where the electronic media is a digital image or digital frame(s) of a video, the elements may be a plurality of pixels of the digital image or digital frame(s), media perturbation manager 140 of network proxy server 115 may apply a perturbation to each pixel of the digital image or digital frame(s) of the video based on an algorithm. The algorithm may be a perturbation algorithm that may apply one or more perturbations to electronic media based on one or more inputs to the algorithm. In some cases, the inputs to the algorithm may include, but is not limited to, a size of the electronic media, a format type of the electronic media, a pixel area associated with detected facial data in the electronic media. For example, media perturbation manager 140 of network proxy server 115 may apply a perturbation to each pixel associated with the facial data of the digital image. As such, an identity or identities associated with an individual or individuals of the facial data is masked to one or more image recognition algorithms associated with the internet-based service based on the applied perturbations to the facial data of the digital image.

A perturbation may be an artifact (e.g., noise) added to an element of the electronic media. In some cases, the perturbation applied to the electronic media may differ in visual perceptibility. For example, in some cases, a perturbation may be visually non-visible. In another example, the perturbation may be visually visible. In some cases, a perturbation may be classified as visually non-visible when the perturbation occupies a proportion (e.g., percentage) of the electronic media. For example, in the case that the electronic media is a digital image and the elements are pixels, if one or more perturbations are applied across a percentage of pixels that is above a threshold value the perturbation may be classified as perceptibly visible (e.g., by an individual observing the image). Alternatively, if one or more perturbations are applied across a percentage of pixels that is below a threshold value the perturbation may be classified as perceptibly non-visible (i.e., by an individual observing the image). The threshold value may be a number of pixels or a percentage of pixels. In either example, whether the perturbations are visually visible or visually non-visible an identity associated with an individual in the image is masked to one or more image recognition algorithms associated with the internet-based service based on the applied perturbations to the facial data of the image.

In some cases, the perturbation may be noise (e.g., Gaussian noise, salt-and-pepper noise, shot noise, Quantization noise (uniform noise)). Alternatively, the algorithm may be a perturbation algorithm that may apply one or more perturbations to electronic media based a global variable of the algorithm. The global variable may indicate to apply a percentage of perturbations to the electronic media. For example, media perturbation manager 140 of network proxy server 115 may apply 20% of perturbations (e.g., Gaussian noise) to the image.

The electronic media may also include metadata. Metadata may include information associated with the electronic media itself as well as information about its production. The metadata may also include metadata generated by device 105. For example, metadata of electronic media originating (i.e., captured) or non-originating by device 105 may include geo-location associated with where the electronic media was captured, details of the originating device, date and time of when the captured electronic media, etc. For example, metadata of the image associated with the electronic request may indicate that the image was captured on Dec. 3, 1991 at 12:03 am standard time (ST) and that it was captured in Mountain View, Calif. In some cases, the security action may, additionally or alternatively, include identifying metadata associated with the electronic media and removing the metadata from the electronic media.

Alternatively, the electronic media may be pre-processed by an application running on the device 105. For example, application 135 may be an internet-based service application, such as a social network application. Similarly, application 135 may generate an electronic request to upload an electronic media. Prior to uploading the electronic media (e.g., an image or a video), application 135 may transmit/forward the electronic request to media perturbation manger 140 on device 105. Media perturbation manger 140 on device 105 may be another internet-based service application running on device 105. Media perturbation manger 140 on device 105 may perform the pre-processing of the electronic media, as described herein. Upon pre-processing the electronic media, media perturbation manger 140 on device 105 may transmit the pre-processed electronic media directly to server 120. Alternatively, media perturbation manger 140 on device 105 may communicate with network proxy server 115 to perform the pre-processing of the electronic media and transmit the pre-processed electronic media to server 120, as described herein.

The electronic media with the applied perturbations may appear visually the same to an individual as the original electronic media. For example, the image or the frames of the video with the applied perturbations may look visually the same to an individual as the original image or the original frame(s) of the video. By applying the perturbations to the electronic media, the described techniques may effectively fool machine learning-based and computer vision-based image recognition models by exploiting a known vulnerability, called adversarial sample crafting. As such, contents of the image with the applied perturbations may avoid being recognized by an image recognition model. That is, the image recognition model may be unsuccessful in detecting and identifying individuals within the image based on the applied perturbations. As such, the techniques of the present disclosure protect the privacy of individuals that are included in publically shared media, while preserving the recognizable visual identify of the individual in the shared media.

Beneficially, the techniques described herein may provide for flexibility where electronic media is pre-processed prior to transmitting the electronic media to the internet-based service for upload. Furthermore, the techniques described herein provide improvements to the operation of device 105. In one case, by having the electronic media pre-processed by a network proxy server, resources (e.g., processing resources, CPU utilization, battery conservation) of device 105 are preserved. Additionally, the techniques described herein may provide efficiency to environment 100 by reducing potential latency associated with uploading electronic media to server 120.

Figure 2:
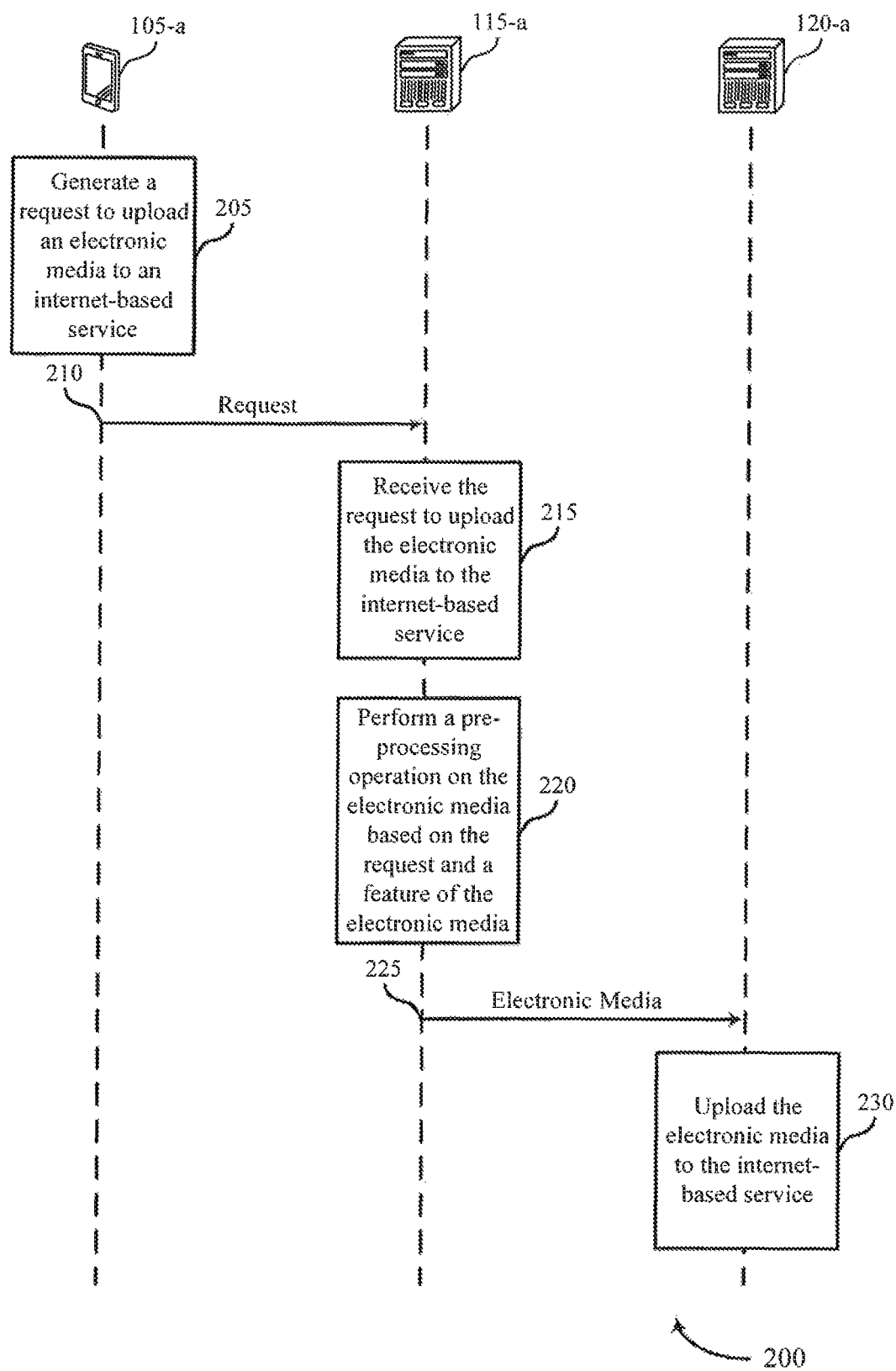
FIGS. 2 and 3 illustrate examples of a process flow that supports applying adversarial perturbations to electronic media to protect user-privacy against machine learning-based recognition algorithms, in accordance with aspects of the present disclosure.

FIG. 2 illustrates an example of a process flow 200 that supports applying adversarial perturbations to electronic media to protect user-privacy against machine learning-based recognition algorithms, in accordance with aspects of the present disclosure. In some configurations, process flow 200 may be implemented by the media perturbation manager 140 as described in FIG. 1. In some configurations, process flow 200 may be implemented in conjunction with the application 135 and/or the user interface 130 described with reference to FIG. 1. Device 105-a, network proxy server 115-a, and server 120-a may be an example of aspects of device 105, network proxy server 115, and server 120 as described with reference to FIG. 1.

In the following description of the process flow 200, the operations between device 105-a, network proxy server 115-a, and server 120-a may be transmitted in a different order than the exemplary order shown, or the operations performed device 105-a, network proxy server 115-a, or server 120-a may be performed in different orders or at different times. Certain operations may also be left out of the process flow 200, or other operations may be added to the process flow 200.

At block 205, device 105-a may generate an electronic request to upload an electronic media to an internet-based service. The electronic media may include a photograph image or a video image, or both. In some examples, the internet-based service may be an image sharing service, or any third-party service that shares the electronic media publically, e.g., on the Internet. For example, the internet-based service may be a professional employment website, where an individual may create a profile of the website. The profile may include a background, relevant work experience, skills, education. An individual may enter personal information into the profile on the website (e.g., via user interface 130 on device 105). The profile may also include an area for the individual to upload an image. In this case, the electronic media in the electronic request may be a request to upload an image of the individual to the professional employment website.

Once the image of the individual is uploaded to the website, the image may be publically available including the personal information. This makes it easy for malicious individuals committing fraud to compromise identity information or provide a potential platform for cyber stalking of the individual. In some cases, the malicious individual, seeking to compromise the personal information or cyber stalk the individual, may use neural network models (i.e., image recognition algorithms) to identify other instances of the individual on the Internet. Thus, the present techniques of the disclosure provide mechanism for protecting the privacy of individuals that are included in publically shared media, while preserving the recognizable visual identify of the individual.

At 210, device 105-a may transmit the electronic request to network proxy server 115-a. In some cases, the transmission of the electronic request to network proxy server 115-a from device 105-a may use a security protocol to secure the transmission and connection between the device 105-a and network proxy server 115-a. The security protocol may be a cryptographic protocol or encryption protocol. In some cases, the security protocol may include HTTPS over transport layer security (TLS), HTTP over SSL, and HTTP Secure.

At block 215, network proxy server 115-a may receive the electronic request to upload the electronic media to the internet-based service. At block 220, network proxy server 115-a may perform a pre-processing operation on the electronic media based on the electronic request and a feature of the electronic media. In some examples, network proxy server 115-a may perform an analysis on the electronic media as part of the pre-processing operation. In this case, the analysis may be performed on the image included in the electronic request transmitted by device 105-a.

Network proxy server 115-a may detect facial data associated with the electronic media based on the analysis. In some cases, the analysis may include detecting key-features by applying a key-point detection algorithm to the electronic media. The key-features may include facial features such as eyes, nose, mouth, eyebrows, etc. The key-feature(s) may be provided in the facial data. For example, network proxy server 115-a may determine that an individual is present in the image.

Upon detected facial data in the electronic media, network proxy server 115-a may perform a security action on the electronic media. A security action may include generating and applying one or more perturbations to the electronic media. For instance, the network proxy server 115-a may apply perturbations to the image. In some cases, network proxy server 115-a may apply perturbations to elements of the electronic media based on a gradient of a model. The gradient may be associated with a neural network model using a public database of electronic media. As such, contents of the electronic media with the applied perturbations may avoid being recognized by the neural network model (e.g., an image recognition model). That is, the image recognition model may be unsuccessful in detecting and identifying the individual within the image based on the applied perturbations.

At 225, network proxy server 115-a may transmit the electronic media to server 120-a. In some cases, the transmission of the electronic media to server 120-a from network proxy server 115-a may use a security protocol to secure the transmission and connection between the server 120-a and network proxy server 115-a. The security protocol may be a cryptographic protocol or encryption protocol. In some cases, the security protocol may include HTTPS over TLS, HTTP over SSL, and HTTP Secure. At block 230, server 120-a may upload the electronic media to the internet-based service. In some cases, server 120-a may transmit an acknowledgement message to device 105-a. The acknowledgement message may indicate that the electronic media has been uploaded successfully.

Figure 3:
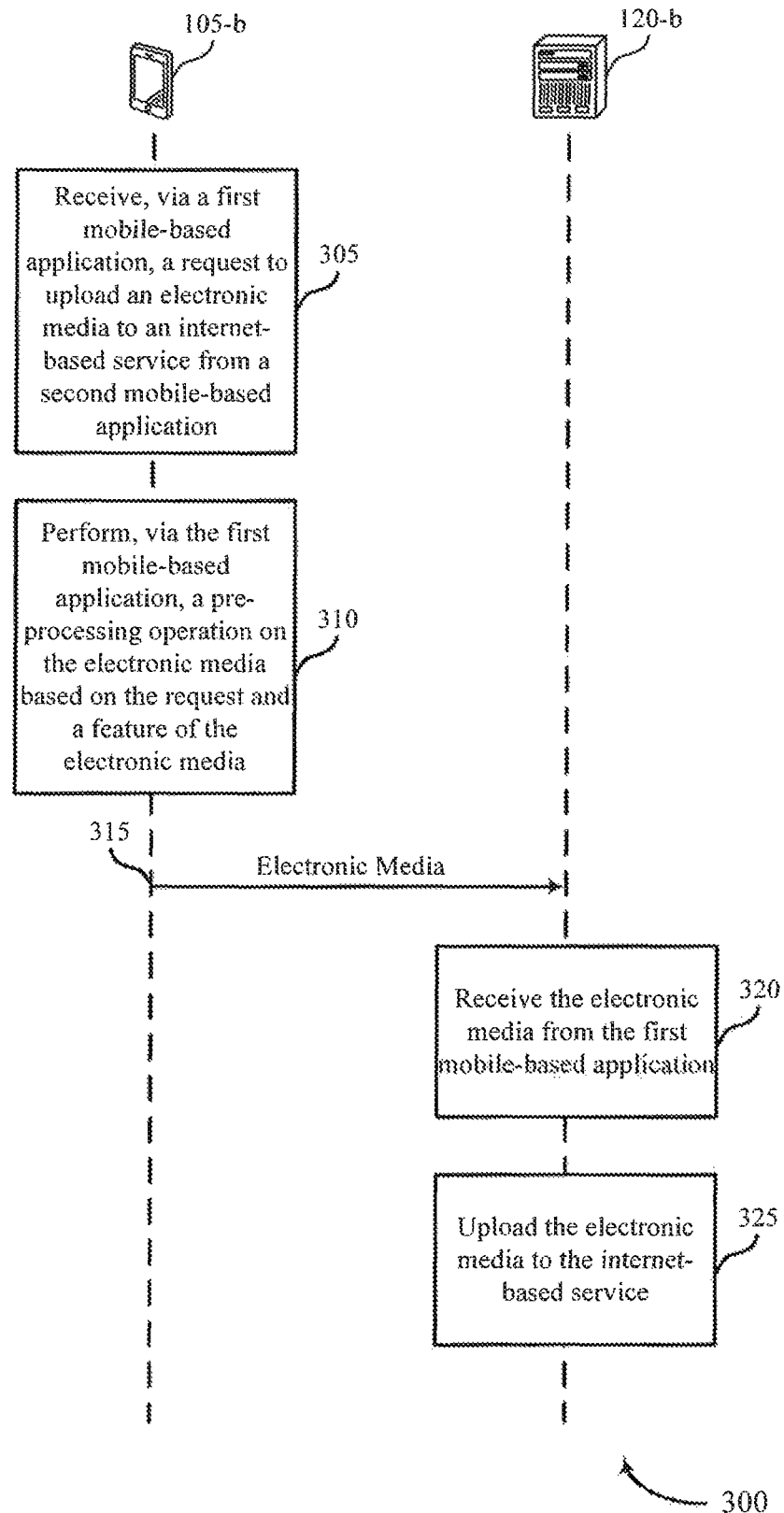

FIG. 3 illustrates an example of a process flow 300 that supports applying adversarial perturbations to electronic media to protect user-privacy against machine learning-based recognition algorithms, in accordance with aspects of the present disclosure. In some configurations, process flow 300 may be implemented by the media perturbation manager 140 as described in FIG. 1. In some configurations, process flow 300 may be implemented in conjunction with the application 135 and/or the user interface 130 described with reference to FIG. 1. Device 105-b and server 120-b may be an example of aspects of device 105 and server 120 as described with reference to FIG. 1.

In the following description of the process flow 300, the operations between device 105-b and server 120-b may be transmitted in a different order than the exemplary order shown, or the operations performed device 105-b and server 120-b may be performed in different orders or at different times. Certain operations may also be left out of the process flow 300, or other operations may be added to the process flow 300.

At block 305, device 105-b may receive, via first mobile-based application, an electronic request to upload an electronic media to an internet-based service from a second mobile-based application. The electronic media may be a digital image or a video including multiple video frames. At block 310, device 105-b may perform, via the first mobile-based application, a pre-processing operation on the electronic media based on the electronic request and a feature of the electronic media.

At 315, device 105-b may transmit the electronic media to server 120-b. In some cases, the transmission of the electronic media to server 120-b from device 105-b may use a security protocol to secure the transmission and connection between the server 120-b and device 105-b. At block 320, server 120-b may receive the electronic media from the first mobile-based application. At block 325, server 120-b may upload the electronic media to the internet-based service.

Figure 4:
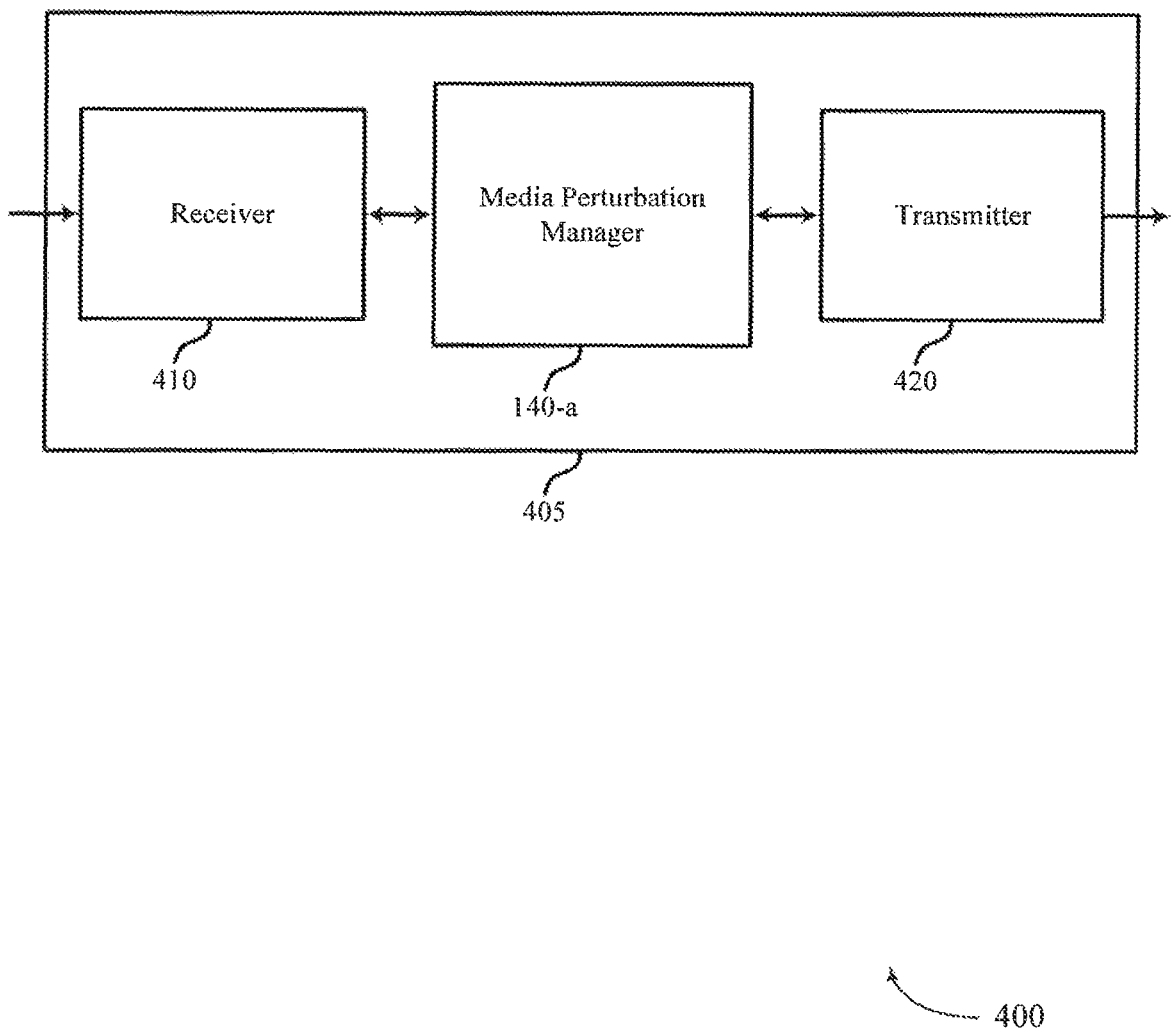
FIGS. 4 and 5 illustrate block diagrams of a computing device that supports applying adversarial perturbations to electronic media to protect user-privacy against machine learning-based recognition algorithms, in accordance with aspects of the present disclosure.

FIG. 4 illustrates a block diagram 400 of a computing device 405 that supports applying adversarial perturbations to electronic media to protect user-privacy against machine learning-based recognition algorithms, in accordance with aspects of the present disclosure. Computing device 505 may be an example of aspects of device 105 or network proxy server 115 as described with reference to FIGS. 1 through 3. Computing device 405 may include one or more processors. Each of the components of device 405 may be in communication with one another (e.g., via one or more buses).

Receiver 410 may receive an electronic request in the form of electronic messages. The electronic messages may include metadata. Receiver 410 may communicate with one or more servers 120 over a network 110 as described with reference to FIG. 1. A received electronic message and components of the electronic message may be passed on to other components of the computing device 405. In some cases, receiver 410 may be an example of aspects of the transceiver 725 described with reference to FIG. 7. The receiver may utilize a single antenna or a set of antennas.

Media perturbation manager 140-a and/or at least some of its various sub-components may be implemented in hardware, software executed by a processor, firmware, or any combination thereof. If implemented in software executed by a processor, the functions of the media perturbation manager 140-a and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The media perturbation manager 140-a and/or at least some of its various sub-components may be physically located at various positions, including being distributed such that portions of functions are implemented at different physical locations by one or more physical devices. In some examples, media perturbation manager 140-a and/or at least some of its various sub-components may be a separate and distinct component in accordance with various aspects of the present disclosure. In other examples, media perturbation manager 140-a and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Media perturbation manager 140-a may receive an electronic request to upload an electronic media to an internet-based service; perform a pre-processing operation on the electronic media based at least in part on the electronic request and a feature of the electronic media; and transmit the electronic media to the internet-based service.

Transmitter 420 may transmit signals generated by other components of the computing device 405. In some examples, the transmitter 420 may be collocated with a receiver 410 in a transceiver module. For example, the transmitter 420 may be an example of aspects of the transceiver 725 described with reference to FIG. 7. The transmitter 420 may utilize a single antenna or a set of antennas.

Figure 5:
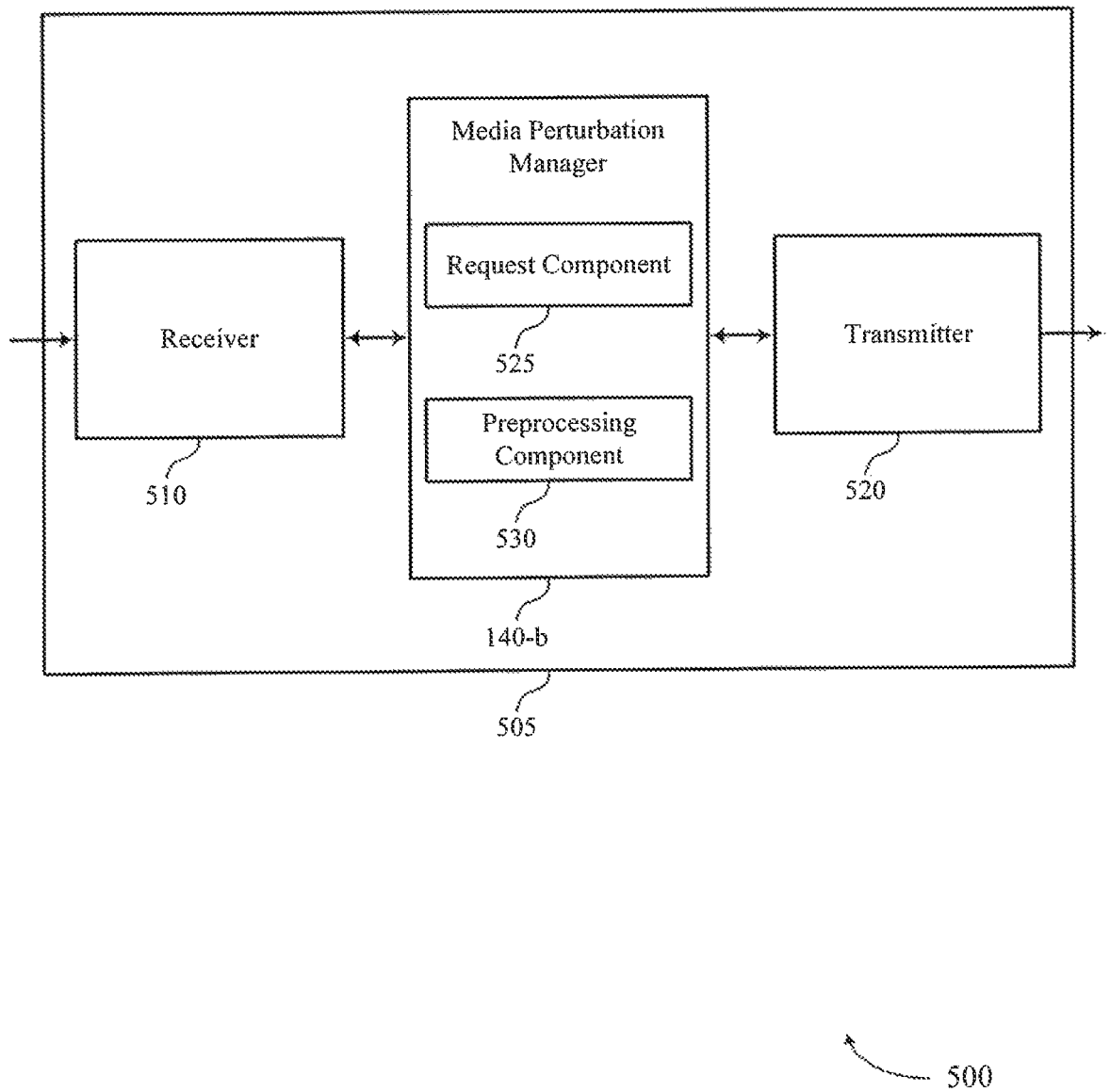

FIG. 5 illustrates a block diagram 500 of a computing device 505 that supports applying adversarial perturbations to electronic media to protect user-privacy against machine learning-based recognition algorithms, in accordance with aspects of the present disclosure. Computing device 505 may be an example of aspects of device 105 or network proxy server 115 as described with reference to FIGS. 1 through 3. Computing device 505 may include one or more processors. Each of the components of device 505 may be in communication with one another (e.g., via one or more buses).

Receiver 510 may receive an electronic request in the form of electronic messages (e.g., emails, short message services (SMS) mobile messages). Receiver 510 may communicate with one or more servers 120 over a network 110 as described with reference to FIG. 1. A received electronic message and components of the electronic message may be passed on to other components of the computing device 505. In some cases, receiver 510 may be an example of aspects of the transceiver 725 described with reference to FIG. 7. The receiver may utilize a single antenna or a set of antennas.

Media perturbation manager 140-b may be an example of aspects of the media perturbation manager 140 described with reference to FIG. 1 or media perturbation manager 140-a described with reference to FIG. 4. Media perturbation manager 140-b may also include a request component 525 and a pre-processing component 530. Request component 525 may receive an electronic request to upload an electronic media to an internet-based service. The electronic media may include at least one photograph image or at least one video image, or both. Pre-processing component 530 may perform a pre-processing operation on the electronic media based at least in part on the electronic request and a feature of the electronic media. In some cases, the pre-processing operation may be performed prior to the transmitting of the electronic media to the internet-based service. The feature of the electronic media may include facial data. The pre-processing component 530 may transmit the electronic media to the internet-based service.

Transmitter 520 may transmit signals generated by other components of the computing device 505. In some examples, the transmitter 520 may be collocated with a receiver 510 in a transceiver module. For example, the transmitter 520 may be an example of aspects of the transceiver 725 described with reference to FIG. 7. The transmitter 520 may utilize a single antenna or a set of antennas.

Figure 6:
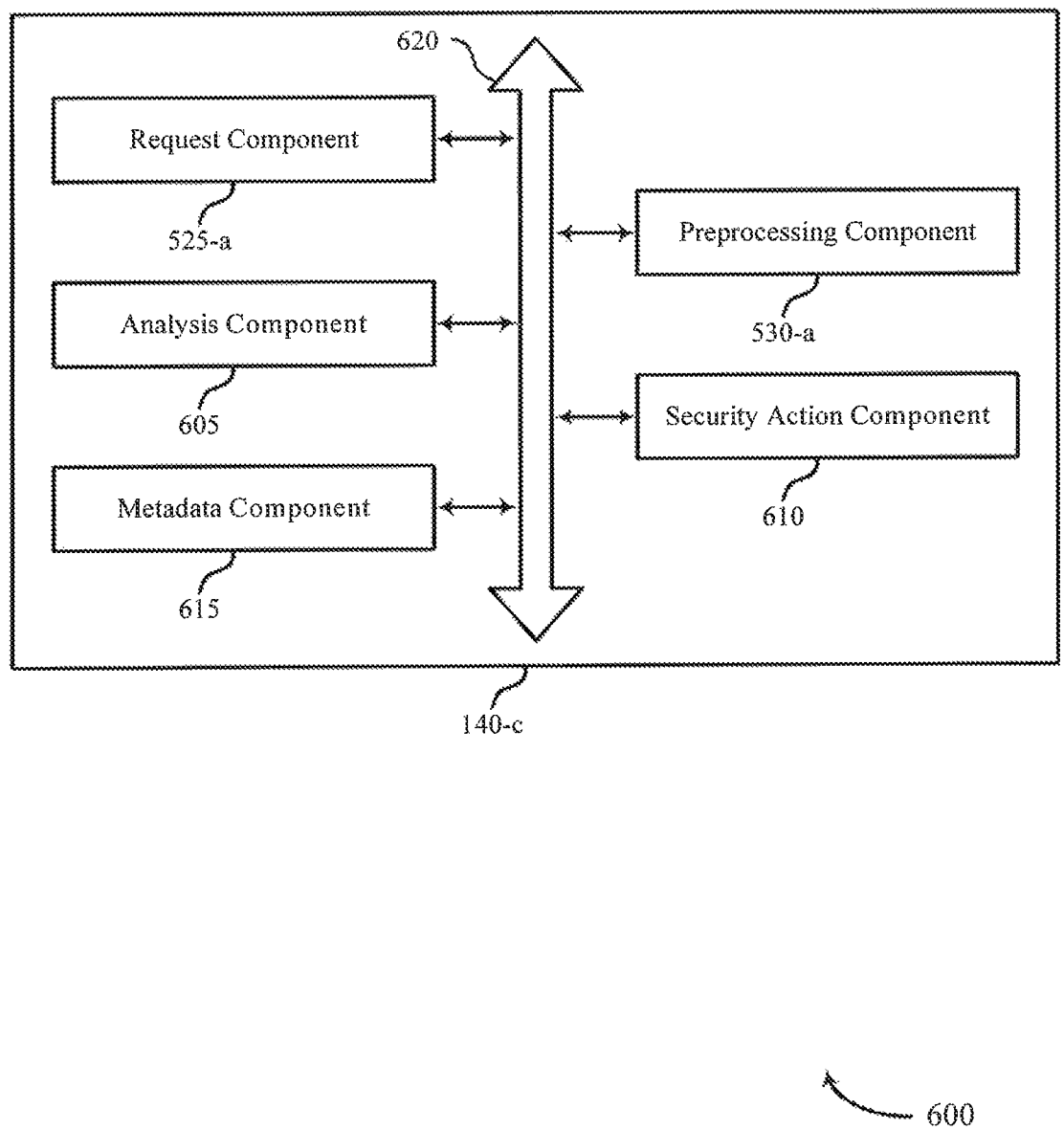
FIG. 6 illustrates a block diagram of a media perturbation manager that supports applying adversarial perturbations to electronic media to protect user-privacy against machine learning-based recognition algorithms, in accordance with aspects of the present disclosure.

FIG. 6 illustrates a block diagram 600 of a media perturbation manager 140-c that supports applying adversarial perturbations to electronic media to protect user-privacy against machine learning-based recognition algorithms, in accordance with aspects of the present disclosure. The media perturbation manager 140-c may be an example of aspects of a media perturbation manager 140, media perturbation manager 140-a, media perturbation manager 140-b, media perturbation manager 140-d, media perturbation manager 140-e, or media perturbation manager 140-f described with reference to FIGS. 1, 4 through 5, 10 and 11. The media perturbation manager 140-c may include a request component 525-a, a preprocessing component 530-a, an analysis component 605, a security action component 610, and a metadata component 615. Each of these modules may communicate, directly or indirectly, with one another (e.g., via bus 620).

Request component 525-a may be an example of aspects of request component 525 describes with reference to FIG. 5. Request component 525-a may receive an electronic request to upload an electronic media to an internet-based service. The electronic media may include at least one photograph image or at least one video image, or both.

Pre-processing component 530-a may be an example of aspects of pre-processing component 530 describes with reference to FIG. 5. Pre-processing component 530-a may perform a pre-processing operation on the electronic media based at least in part on the electronic request and a feature of the electronic media. In some cases, the pre-processing operation may be performed prior to the transmitting of the electronic media to the internet-based service. The feature of the electronic media may include facial data. The pre-processing component 530-a may transmit the electronic media to the internet-based service. Analysis component 605 may perform an analysis on the electronic media; detect facial data associated with the electronic media based at least in part on the analysis.

Security action component 610 may perform a security action on the electronic media based at least in part on the detected facial data. In some cases, security action component 610 may apply perturbations to elements of the electronic media based at least in part on a gradient of a model. The model of the gradient may be associated with a neural network model using a public database of electronic media. In some examples, the electronic media may be a digital image and the elements may include a plurality of pixels of the digital image. Security action component 610 may apply a perturbation to each pixel of the digital image based at least in part on an algorithm. Alternatively, security action component 610 may apply a perturbation to each pixel associated with the facial data of the digital image. In some cases, an identity associated with an individual of the facial data is masked to one or more image recognition algorithms associated with the internet-based service based at least in part on the applied perturbations to the facial data of the digital image. Metadata component 615 may identify metadata associated with the electronic media, and remove the metadata from the electronic media based at least in part on the identifying.

Figure 7:
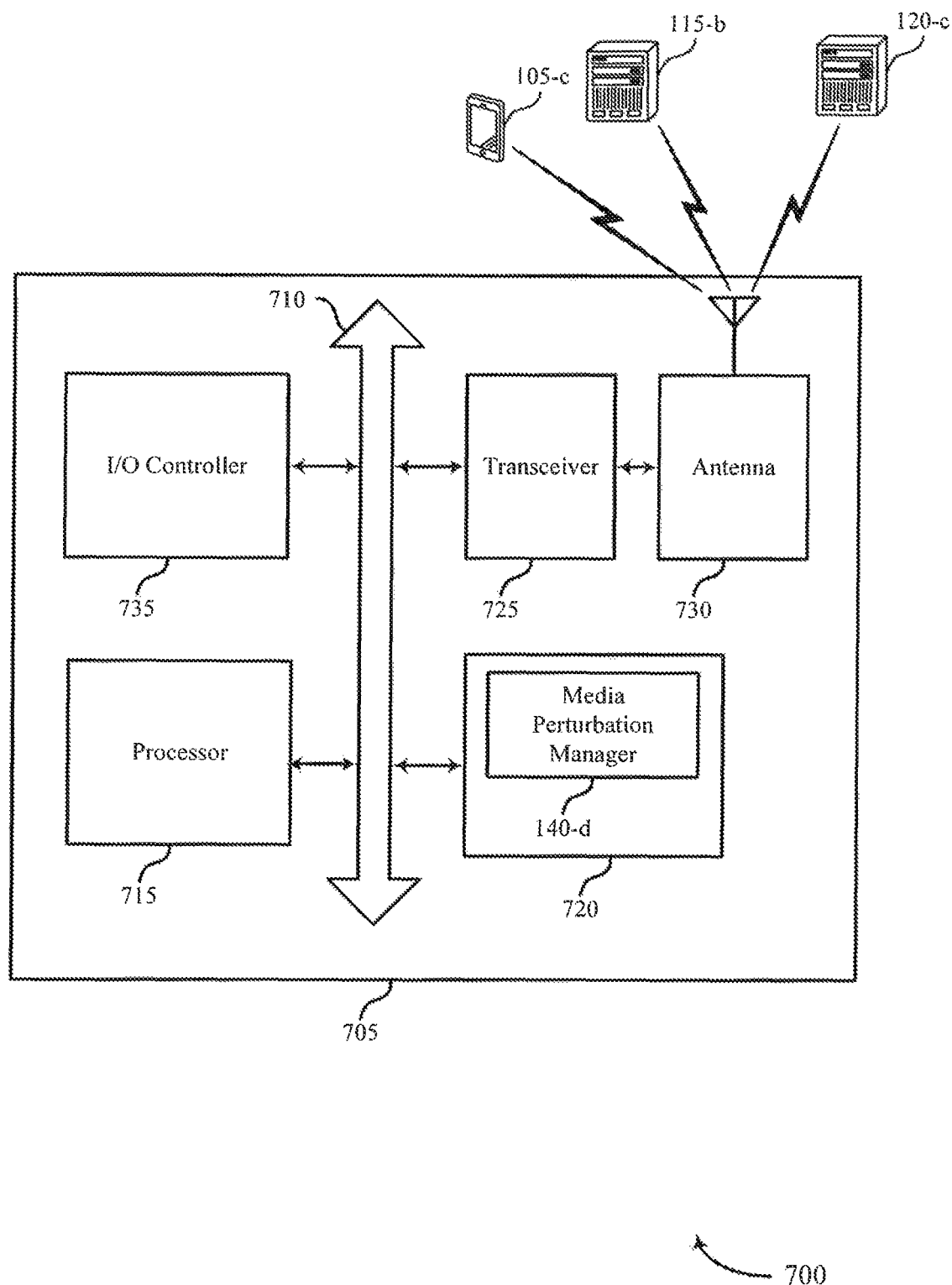
FIG. 7 illustrates a block diagram of a system including a computing device that supports applying adversarial perturbations to electronic media to protect user-privacy against machine learning-based recognition algorithms, in accordance with aspects of the present disclosure.

FIG. 7 illustrates a block diagram of a system 700 including a computing device 705 that supports applying adversarial perturbations to electronic media to protect user-privacy against machine learning-based recognition algorithms, in accordance with aspects of the present disclosure. Computing device 705 may be an example of device 105 or network proxy server 115 and its components as described herein. System 700 may also include device 105-c, network proxy server 115-b, and server 120-c, which may be an example of device 105, or network proxy server 115 as described with reference to FIG. 1 through 3.

Computing device 705 may include a bus 710 which interconnects major subsystems of device 705, such as one or more processors 715, a system memory 720 (read-only memory (ROM) or flash memory (neither shown), and random access memory (RAM) (not shown), flash RAM, or the like), an I/O controller 735, a transceiver 725, and an antenna 730.

Processor 715 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 715 may be configured to operate a memory array using a memory controller. In other cases, a memory controller may be integrated into processor 715. Processor 715 may be configured to execute computer-readable instructions stored in a memory to perform various functions (e.g., functions or tasks supporting applying adversarial perturbations to electronic media to protect user-privacy against machine learning-based recognition algorithms).

Bus 710 may allow data communication between processor 715 and system memory 720, which may include ROM or flash memory (neither shown), and RAM (not shown), as previously noted. The RAM is generally the main memory into which the operating system and application programs are loaded. The ROM or flash memory can contain, among other code, the Basic Input-Output system (BIOS) or a Unified Extensible Firmware Interface (UEFI), which controls basic hardware operation such as the interaction with peripheral components or devices. For example, media perturbation manager 140-d, to implement the present techniques, may be stored within system memory 720. The system memory 720 may store computer-readable, computer-executable software including instructions that, when executed, cause the processor to perform various functions described herein. In some cases, the system memory 720 may contain, among other things, a BIOS which may control basic hardware or software operation such as the interaction with peripheral components or devices.

Media perturbation manager 140-d may be an example of the media perturbation manager 140, 140-a, 140-b, and 140-c with reference to FIGS. 1, 4 through 6, and 10. Applications resident within device 705 may be stored on and accessed via a non-transitory computer readable medium, such as a hard disk drive, an optical drive, or other storage medium. Additionally, applications can be in the form of electronic signals modulated in accordance with the application and data communication technology when accessed via a network.

Transceiver 725 may communicate bi-directionally, via one or more antennas, wired, or wireless links as described above. For example, the transceiver 725 may represent a wireless transceiver and may communicate bi-directionally with another wireless transceiver. In some cases, the computing device 705 may include a single antenna 730. However, in some cases the computing device 705 may have more than one antenna 730, which may be capable of concurrently transmitting or receiving multiple wireless transmissions.

Figure 8:
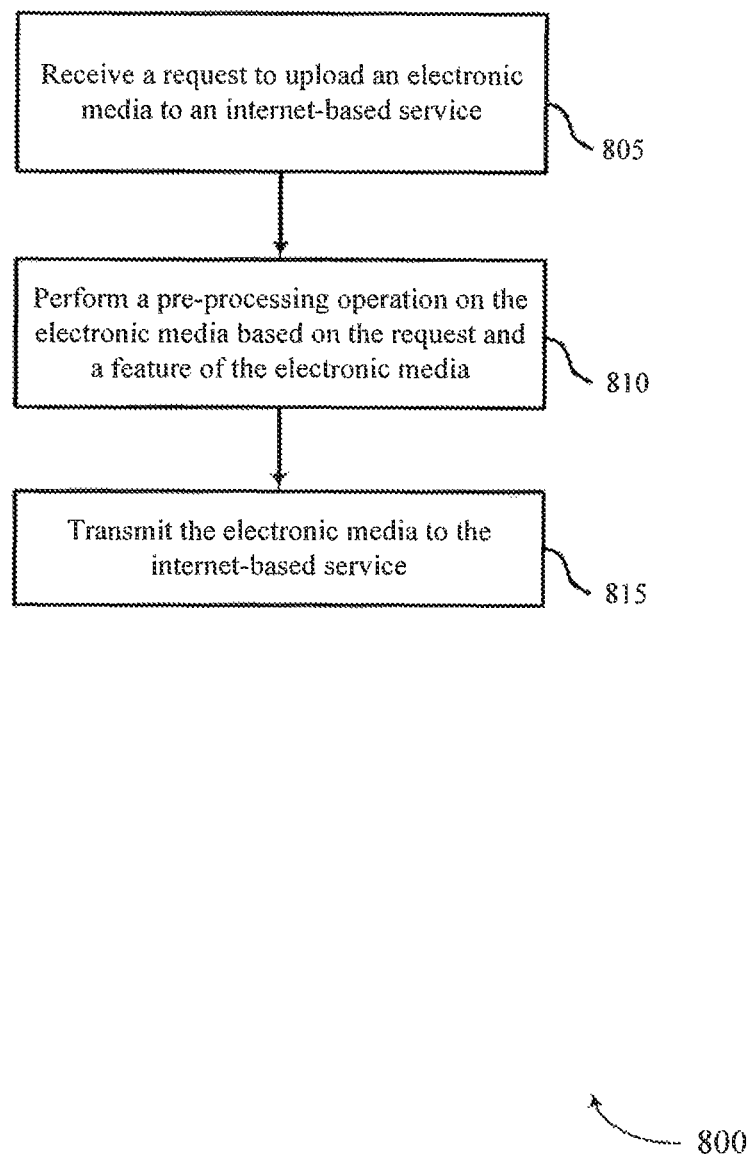
FIGS. 8 and 9 show flowcharts illustrating example methods for applying perturbations to electronic media, in accordance with aspects of the present disclosure.

FIG. 8 shows a flowchart illustrating an example method 800 for applying perturbations to electronic media, in accordance with aspects of the present disclosure. The operations of method 900 may be implemented by device 105 or network proxy server 115 and its components as described herein. For example, the operations of method 900 may be performed by a media perturbation manager as described with reference to FIGS. 1, 4 through 7, and 10.

In some examples, device 105 or network proxy server 115 may execute a set of codes to control the functional elements of device 105 or network proxy server 115 to perform the functions described below. Additionally or alternatively, device 105 or network proxy server 115 may perform aspects of the functions described below using special-purpose hardware. In some configurations, the method 900 may be implemented in conjunction with user interface 130 or application 135 as described with reference to FIG. 1. In the following description of the method 800, the operations may be performed in a different order than the exemplary order shown. Certain operations may also be left out of the method 800, or other operations may be added to the method 800.

At block 805, the device 105 or network proxy server 115 may receive an electronic request to upload an electronic media to an internet-based service. In some examples, the electronic media may be a photograph image or at least one video image, or both. The operations of block 805 may be performed according to the methods described herein. In certain examples, aspects of the operations of block 805 may be performed by a request component as described with reference to FIGS. 5 and 6.

At block 810, the device 105 or network proxy server 115 may perform a pre-processing operation on the electronic media based on the electronic request and a feature of the electronic media. The feature of the electronic media may include facial data. For example, facial data may include a region of a photograph image or a video frame where one or more individuals are detected. The operations of block 810 may be performed according to the methods described herein. In certain examples, aspects of the operations of block 810 may be performed by a pre-processing component as described with reference to FIGS. 5 and 6.

At block 815, the device 105 or network proxy server 115 may transmit the electronic media to the internet-based service. The operations of block 815 may be performed according to the methods described herein. In certain examples, aspects of the operations of block 815 may be performed by a pre-processing component as described with reference to FIGS. 5 and 6.

Figure 9:
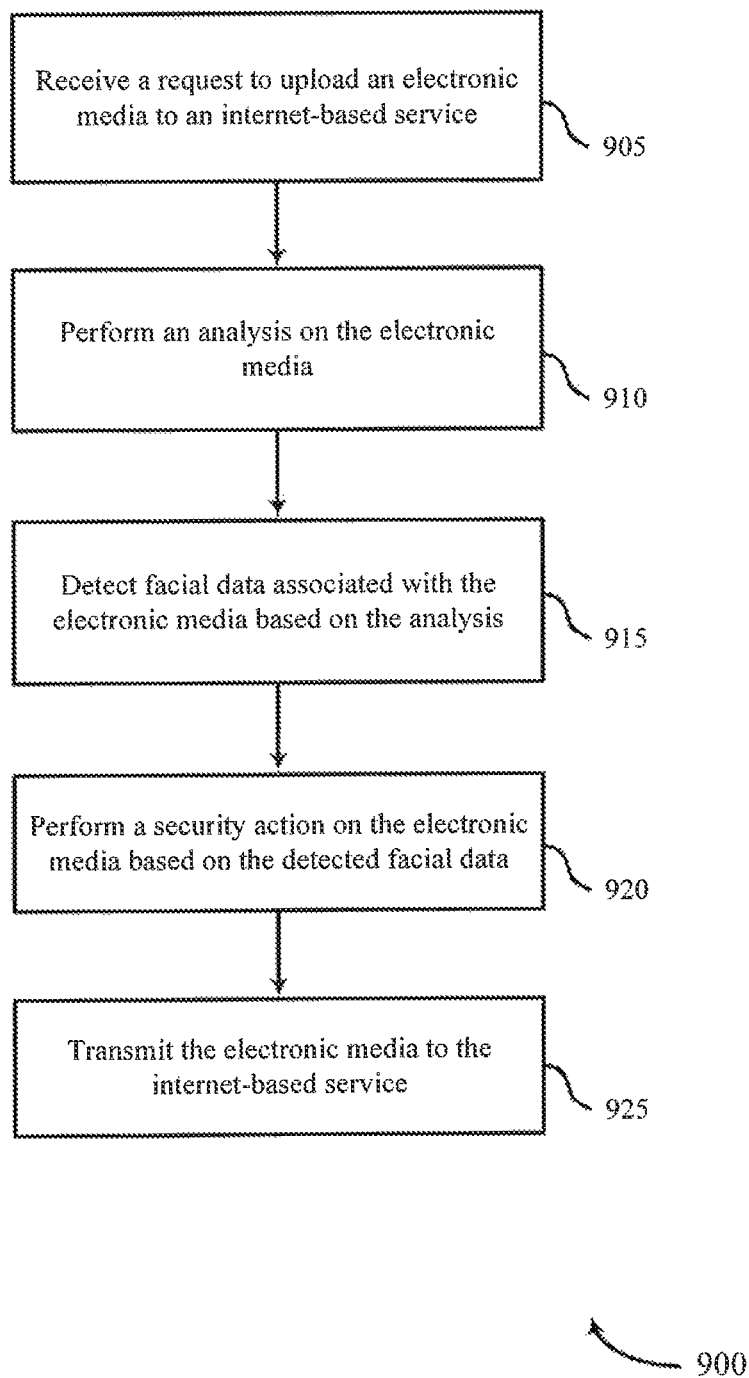

FIG. 9 shows a flowchart illustrating an example method 900 for applying perturbations to electronic media, in accordance with aspects of the present disclosure. The operations of method 900 may be implemented by device 105 or network proxy server 115 and its components as described herein. For example, the operations of method 900 may be performed by a media perturbation manager as described with reference to FIGS. 1, 4 through 7, and 10.

In some examples, device 105 or network proxy server 115 may execute a set of codes to control the functional elements of device 105 or network proxy server 115 to perform the functions described below. Additionally or alternatively, device 105 or network proxy server 115 may perform aspects of the functions described below using special-purpose hardware. In some configurations, the method 900 may be implemented in conjunction with user interface 130 or application 135 as described with reference to FIG. 1. In the following description of the method 900, the operations may be performed in a different order than the exemplary order shown. Certain operations may also be left out of the method 900, or other operations may be added to the method 900.

At block 905, device 105 or network proxy server 115 may receive an electronic request to upload an electronic media to an internet-based service. The operations of block 905 may be performed according to the methods described herein. In certain examples, aspects of the operations of block 905 may be performed by a request component as described with reference to FIGS. 5 and 6.

At block 910, device 105 or network proxy server 115 may perform an analysis on the electronic media. The operations of block 910 may be performed according to the methods described herein. In certain examples, aspects of the operations of block 910 may be performed by an analysis component as described with reference to FIG. 6.

At block 915, device 105 or network proxy server 115 may detect facial data associated with the electronic media based on the analysis. In some cases, the analysis may include detecting key-features by applying a key-point detection algorithm to the electronic media. The key-point detection algorithm may be a Bayesian model that device 105 or network proxy server 115 may apply to the electronic media to identify one or more key-features such as eyes, nose, mouth, eyebrows, ears, jaw-line, etc. The key-feature(s) may be provided in the facial data. In some examples, the electronic media may be a photograph image or at least one video image, or both. The operations of block 915 may be performed according to the methods described herein. In certain examples, aspects of the operations of block 915 may be performed by an analysis component as described with reference to FIG. 6.

At block 920, device 105 or network proxy server 115 may perform a security action on the electronic media based on the detected facial data. In one embodiment, the security action may include applying perturbations to elements of the electronic media based on a gradient of a model. In some cases, the perturbations applied to the elements of the electronic media may be based on a perturbation algorithm. In some examples, device 105 or network proxy server 115 may apply perturbations to key-features such as eyes, nose, mouth, eyebrows associated with the facial data of the electronic media based on the gradient of the model or the perturbation algorithm. The operations of block 920 may be performed according to the methods described herein. In certain examples, aspects of the operations of block 920 may be performed by a security action component as described with reference to FIG. 6.

At block 925, device 105 or network proxy server 115 may transmit the electronic media to the internet-based service. For example, device 105 or network proxy server 115 may upload the electronic media with the applied perturbation(s) to a social network website, by transmitting the electronic media to a social network server hosting the social network website. The operations of block 925 may be performed according to the methods described herein. In certain examples, aspects of the operations of block 925 may be performed by a pre-processing component as described with reference to FIGS. 5 and 6.

It should be noted that the methods described above describe possible implementations, and that the operations and the steps may be rearranged or otherwise modified and that other implementations are possible. Further, aspects from two or more of the methods may be combined.

Figure 10:
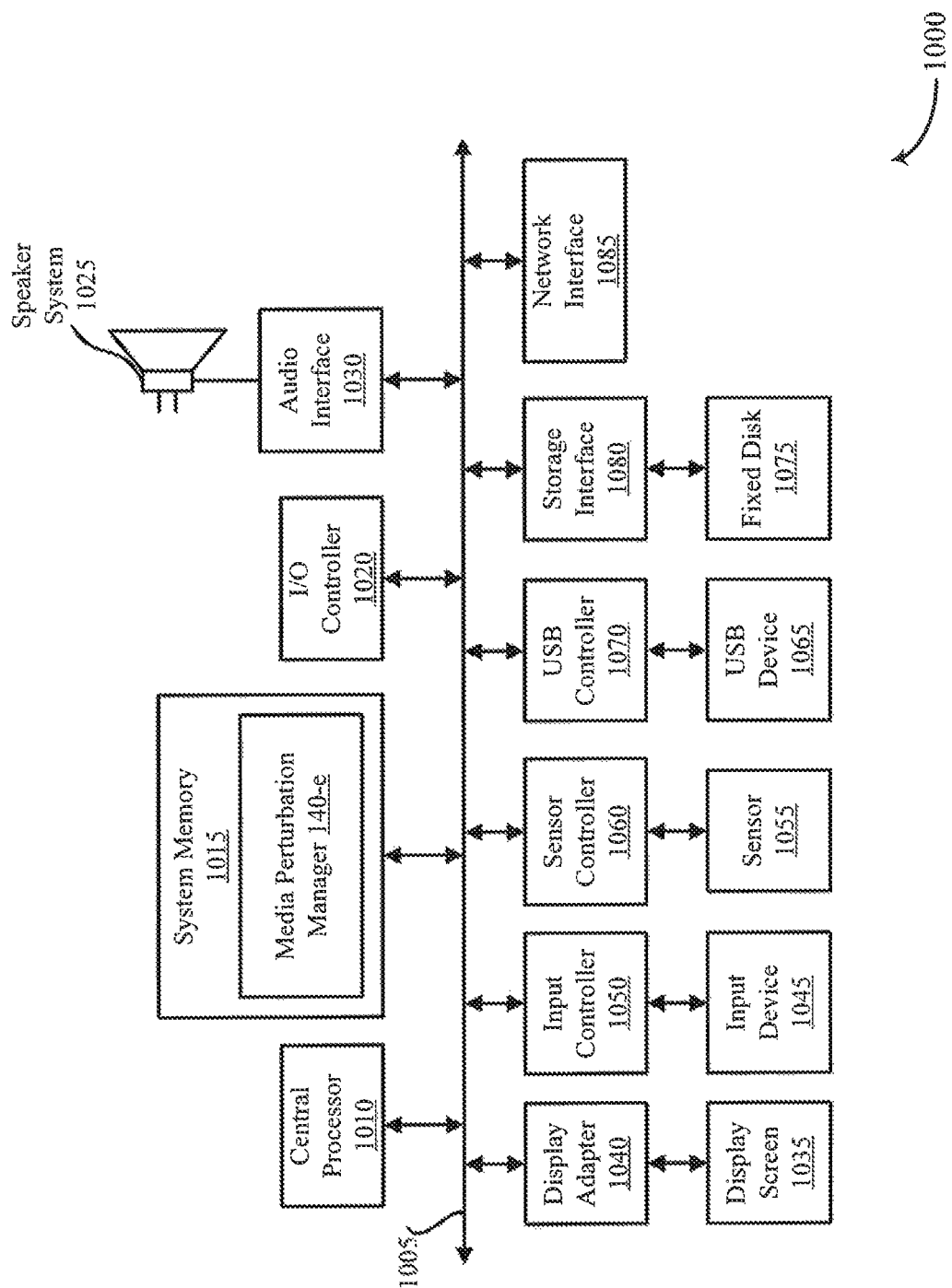
FIG. 10 illustrates a block diagram of a computer system that supports applying adversarial perturbations to electronic media to protect user-privacy against machine learning-based recognition algorithms, in accordance with aspects of the present disclosure.

FIG. 10 illustrates a block diagram of a computer system 1000 that supports applying adversarial perturbations to electronic media to protect user-privacy against machine learning-based recognition algorithms, in accordance with aspects of the present disclosure. The computer system 1000 may be an example of device 105, or proxy server 115, or server 120 as described with reference to FIG. 1 through 3. In one embodiment, computer system 1000 may include a bus 1005 which interconnects major subsystems of computer system 1000, such as a central processor 1010, a system memory 1015 (typically RAM, but which may also include ROM, flash RAM, or the like), an input/output controller 1020, an external audio device, such as a speaker system 1025 via an audio output interface 1030, an external device, such as a display screen 1035 via display adapter 1040, an input device 1045 (e.g., remote control device interfaced with an input controller 1050), multiple USB devices 1065 (interfaced with a USB controller 1070), and a storage interface 1080. Also included are at least one sensor 1055 connected to bus 1005 through a sensor controller 1060 and a network interface 1085 (coupled directly to bus 1005).

Bus 1205 allows data communication between central processor 1010 and system memory 1015, which may include ROM or flash memory (neither shown), and RAM (not shown), as previously noted. The RAM is generally the main memory into which the operating system and application programs are loaded. The ROM or flash memory can contain, among other code, the BIOS or the UEFI, which controls basic hardware operation such as the interaction with peripheral components or devices. For example, the media perturbation manager 140-e, to implement the present techniques, may be stored within the system memory 1015. Applications (e.g., application 135) resident with computer system 1000 are generally stored on and accessed via a non-transitory computer readable medium, such as a hard disk drive (e.g., fixed disk 1075) or other storage medium. Additionally, applications can be in the form of electronic signals modulated in accordance with the application and data communication technology when accessed via interface 1085.

Storage interface 1080, as with the other storage interfaces of computer system 1000, can connect to a standard computer readable medium for storage and/or retrieval of information, such as a fixed disk drive 1075. Fixed disk drive 1075 may be a part of computer system 1000 or may be separate and accessed through other interface systems. Network interface 1085 may provide a direct connection to a remote server via a direct network link to the Internet via a POP (point of presence). Network interface 1085 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 10 need not be present to practice the present techniques. The devices and subsystems can be interconnected in different ways from that shown in FIG. 10. The aspect of some operations of a system such as that shown in FIG. 10 are readily known in the art and are not discussed in detail in this application. Code to implement the present disclosure can be stored in a non-transitory computer-readable medium such as one or more of system memory 1015 or fixed disk 1075. The operating system provided on computer system 1000 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present techniques may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with computer system 1000 may include wireless communication signals such as radio frequency, electromagnetics, local area network (LAN), wide area network (WAN), metropolitan area network (MAN), virtual private network (VPN), wireless network (using 802.11, for example), cellular network (using 3G and/or LTE, for example), and/or other signals. The network interface 1085 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

The I/O controller 1020 may operate in conjunction with network interface 1085 and/or storage interface 1080. The network interface 1085 may enable system 1000 with the ability to communicate with client devices (e.g., device 105 of FIG. 1), and/or other devices over the network 110 of FIG. 1. Network interface 1085 may provide wired and/or wireless network connections. In some cases, network interface 1085 may include an Ethernet adapter or Fiber Channel adapter. Storage interface 1080 may enable system 1000 to access one or more data storage devices. The one or more data storage devices may include two or more data tiers each. The storage interface 1080 may include one or more of an Ethernet adapter, a Fiber Channel adapter, Fiber Channel Protocol (FCP) adapter, a SCSI adapter, and iSCSI protocol adapter.

Figure 11:
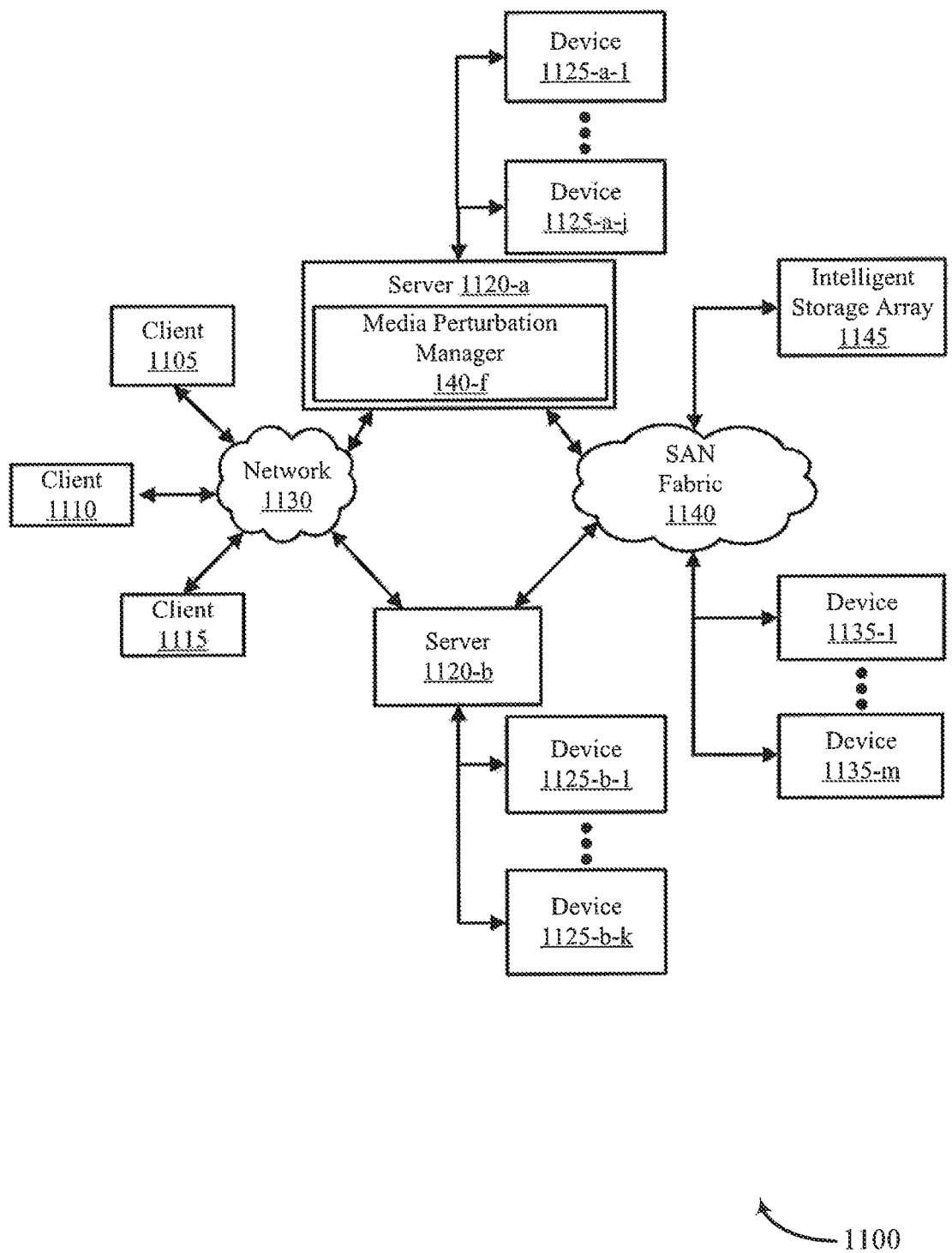
FIG. 11 illustrates a block diagram of a network architecture in which client systems and storage servers may be coupled to a network, in accordance with one or more aspects of the present disclosure.

FIG. 11 illustrates a block diagram of a network architecture 1300 in which client systems and storage servers may be coupled to a network, in accordance with one or more aspects of the present disclosure. In the network architecture 1300, client systems 1105, 1110, and 1115, and storage servers 1120-*a* and 1120-*b* may be coupled to a network 1130, in accordance with one or more aspects of the present disclosure. In one embodiment, the media perturbation manager 140-*f* may be located within one of the storage servers 1120-*a*, 1120-*b* to implement the present techniques. The media perturbation manager 140-*f* may be one example of media perturbation manager 140, 140-*a*, 140-*b*, 140-*c*, 140-*d*, and 140-*e* depicted in FIG. 1 4 through 7, or 10. For example, the media perturbation manager 140-*f* may receive an electronic request to upload an electronic media to an internet-based service; perform a pre-processing operation on the electronic media based on the electronic request and a feature of the electronic media; and transmit the electronic media to the internet-based service.

The storage server 1120-*a* is further depicted as having storage devices 1125-*a-l* through 1125-*a-j* directly attached, and storage server 1120-*b* is depicted with storage devices 1125-*b-l* through 1125-*b-k* directly attached. SAN fabric 1140 supports access to storage devices 1135-*l* through 1135-*m* by storage servers 1120-*a* and 1120-*b*, and so by client systems 1105, 1110 and 1115 via network 1130. Intelligent storage array 1145 is also shown as an example of a specific storage device accessible via SAN fabric 1140.

With reference to computer system 1100, network interface 1185 or some other means or method can be used to provide connectivity from each of client computer systems 1105, 1110 and 1115 to network 1130. With reference to computer system 600, transceiver 625 or some other means or method can be used to provide connectivity from each of client computer systems 1105, 1110 and 1115 to network 1130. Client systems 1105, 1110 and 1115 are able to access information on storage server 1120-*a* or 1120-*b* using, for example, a web browser or other client software (not shown). Such a client allows client systems 1105, 1110 and 1115 to access data hosted by storage server 1120-*a* or 1120-*b* or one of storage devices 1125-*a-l* through 1125-*a-j*, 1125-*b-l* through 1125-*b-k*, 1135-*l* through 1135-*m*, or intelligent storage array 1145. FIG. 11 depicts the use of a network such as the Internet for exchanging data, but the present techniques are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software components that perform certain tasks. These software components may include script, batch, or other executable files that may be stored on a computer-readable storage medium or in a computing system. In some embodiments, these software components may configure a computing system to perform one or more of the exemplary embodiments disclosed herein.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present techniques and their practical applications, to thereby enable others skilled in the art to best utilize the present techniques and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

As used herein, the term "security action" may refer to any number of actions the systems described herein may take after determining a packet injection. For example, types of security actions may include preventing the packet from performing any actions on the computing device, alerting an administrator to the potential maliciousness of the connection, quarantine a file related to the connection, delete the file, block a download of the file, and/or warn a user about the connection. In addition, the systems described herein may perform a security action on objects other than a file. For example, the systems described herein may blacklist malicious URLs and/or IP addresses. Thus, the security actions in conjunction with the methods and systems described herein may improve the security and operating integrity of one or more computing devices by protecting the hardware, firmware, software, or any combination thereof of the one or more computing devices from malicious attack. It should be appreciated that these are not exhaustive lists of the types of security actions which may be performed by the systems described herein. Other security actions are also included in this disclosure.

What is claimed is:

1. A method for applying perturbations to electronic media, the method being performed by one or more computing devices comprising at least one processor, the method comprising:
   receiving an electronic request to upload an electronic media to an internet-based service;
   performing, by the one or more computing devices, a pre-processing operation on the electronic media based at least in part on the electronic request and a feature of the electronic media, wherein the pre-processing operation comprises securing a privacy of the electronic media feature from a machine learning-based recognition algorithm associated with the internet-based service by applying a perturbation to the electronic media feature according to a gradient of the machine learning-based recognition algorithm; and
   transmitting, by the one or more computing devices, the electronic media to the internet-based service.

2. The method of claim 1, wherein the pre-processing operation is performed prior to the transmitting of the electronic media to the internet-based service to upload the electronic media to the internet-based service.

3. The method of claim 1, wherein performing the pre-processing operation comprises:
   performing an analysis on the electronic media;
   detecting facial data associated with the electronic media based at least in part on the analysis; and
   performing a security action on the electronic media based at least in part on the detected facial data.

4. The method of claim 3, wherein performing the security action comprises:
   applying perturbations to elements of the electronic media based at least in part on a gradient of a model.

5. The method of claim 4, wherein the electronic media comprises a digital image and the elements comprises a plurality of pixels of the digital image, and wherein applying the perturbations comprises:
   applying a perturbation to each pixel of the digital image based at least in part on an algorithm.

6. The method of claim 4, wherein the electronic media comprises a digital image and the elements comprises a plurality of pixels of the digital image, and wherein applying the perturbations comprises:
   applying a perturbation to each pixel associated with the facial data of the digital image.

7. The method of claim 6, wherein an identity associated with an individual of the facial data is masked to one or more image recognition algorithms associated with the internet-based service based at least in part on the applied perturbations to the facial data of the digital image.

8. The method of claim 4, wherein the model of the gradient is associated with a neural network model using a public database of electronic media.

9. The method of claim 1, wherein performing the pre-processing operation comprises:
 identifying metadata associated with the electronic media; and
 removing the metadata from the electronic media based at least in part on the identifying.

10. The method of claim 1, wherein the feature of the electronic media comprises facial data.

11. The method of claim 1, wherein the electronic media comprises at least one photograph image or at least one video image, or both.

12. The method of claim 1, wherein the one or more computing devices comprise at least one of a network proxy, or a server, or a mobile phone running an application, or any combination thereof.

13. The method of claim 1, wherein performing the pre-processing operation on the electronic media is performed by a network proxy.

14. A computing device configured for applying perturbations to electronic media, further comprising:
 one or more processors;
 memory in electronic communication with the one or more processors, wherein the memory stores computer executable instructions that when executed by the one or more processors cause the one or more processors to:
 receive an electronic request to upload an electronic media to an internet-based service;
 perform a pre-processing operation on the electronic media based at least in part on the electronic request and a feature of the electronic media, wherein the pre-processing operation comprises securing a privacy of the electronic media feature from a machine learning-based recognition algorithm associated with the internet-based service by applying a perturbation to the electronic media feature according to a gradient of the machine learning-based recognition algorithm; and
 transmit the electronic media to the internet-based service.

15. The computing device of claim 14, wherein the pre-processing operation is performed prior to the transmitting of the electronic media to the internet-based service to upload the electronic media to the internet-based service.

16. The computing device of claim 14, wherein the instructions for performing the pre-processing operation are further executable by the one or more processors to:
 perform an analysis on the electronic media;
 detect facial data associated with the electronic media based at least in part on the analysis; and
 perform a security action on the electronic media based at least in part on the detected facial data.

17. The computing device of claim 16, wherein the instructions for performing the security action are further executable by the one or more processors to:
 apply perturbations to elements of the electronic media based at least in part on a gradient of a model.

18. A non-transitory computer-readable medium storing computer executable instructions that when executed by the one or more processors cause the one or more processors to:
 receive an electronic request to upload an electronic media to an internet-based service;
 perform a pre-processing operation on the electronic media based at least in part on the electronic request and a feature of the electronic media, wherein the pre-processing operation comprises securing a privacy of the electronic media feature from a machine learning-based recognition algorithm associated with the internet-based service by applying a perturbation to the electronic media feature according to a gradient of the machine learning-based recognition algorithm; and
 transmit the electronic media to the internet-based service.

19. The non-transitory computer-readable medium of claim 18, wherein the pre-processing operation is performed prior to the transmitting of the electronic media to the internet-based service to upload the electronic media to the internet-based service.

20. The non-transitory computer-readable medium of claim 18, wherein the feature of the electronic media comprises facial data.

* * * * *